US010575005B2

(12) United States Patent
Su et al.

(10) Patent No.: US 10,575,005 B2
(45) Date of Patent: Feb. 25, 2020

(54) VIDEO CODING AND DELIVERY WITH BOTH SPATIAL AND DYNAMIC RANGE SCALABILITY

(71) Applicant: Dolby Laboratories Licensing Corporation, San Francisco, CA (US)

(72) Inventors: Guan-Ming Su, Fremont, CA (US); Sheng Qu, San Jose, CA (US); Samir N. Hulyalkar, Los Gatos, CA (US); David Brooks, Mountain View, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 207 days.

(21) Appl. No.: 15/745,647

(22) PCT Filed: Jul. 20, 2016

(86) PCT No.: PCT/US2016/043192
§ 371 (c)(1),
(2) Date: Jan. 17, 2018

(87) PCT Pub. No.: WO2017/015397
PCT Pub. Date: Jan. 26, 2017

(65) Prior Publication Data
US 2018/0220144 A1 Aug. 2, 2018

Related U.S. Application Data

(60) Provisional application No. 62/201,266, filed on Aug. 5, 2015, provisional application No. 62/195,561, filed on Jul. 22, 2015.

(51) Int. Cl.
H04N 19/33 (2014.01)
H04N 19/59 (2014.01)

(52) U.S. Cl.
CPC ............. H04N 19/33 (2014.11); H04N 19/59 (2014.11)

(58) Field of Classification Search
CPC ...... H04N 19/33; H04N 19/59; H04N 19/593; H04N 19/60; H04N 1/6005
See application file for complete search history.

(56) References Cited

U.S. PATENT DOCUMENTS 8,593,480 B1 11/2013 Ballestad
9,077,994 B2 7/2015 Miller
(Continued)

FOREIGN PATENT DOCUMENTS

WO 2009/127231 10/2009
WO 2014/107255 7/2014
(Continued)

OTHER PUBLICATIONS

Luthra, Ajay et al "Draft Requirements and Explorations for HDR/WCG Content Distribution and Storage" MPEG Meeting Jul. 7-11, 2014.
(Continued)

Primary Examiner — Obafemi O Sosanya

(57) ABSTRACT

In a method to code and transmit scalable HDR video signals, HDR signals are processed and encoded in the IPT-PQ color space to generate a base layer at reduced spatial resolution and/or dynamic range, and an enhancement layer with a residual signal. A signal reshaping block before the base layer encoder allows for improved coding of HDR signals using a reduced bit depth. A decoder can use a BL decoder and backward reshaping to generate a decoded BL HDR signal at a reduced dynamic range and/or spatial resolution, or it can combine the decoded BL HDR signal and the EL stream to generate a decoded HDR signal at full dynamic range and full resolution.

23 Claims, 6 Drawing Sheets

(56) References Cited

U.S. PATENT DOCUMENTS

| 9,497,456 B2* | 11/2016 | Su | H04N 19/30 |
| 2017/0251211 A1* | 8/2017 | Froehlich | H04N 9/67 |
| 2018/0309995 A1* | 10/2018 | He | H04N 19/126 |

FOREIGN PATENT DOCUMENTS

| WO | 2014/130343 | 8/2014 |
| WO | 2014/160705 | 10/2014 |
| WO | 2014/163793 | 10/2014 |
| WO | 2014/204865 | 12/2014 |
| WO | 2014/140954 | 9/2016 |
| WO | 2016/172091 | 10/2016 |

OTHER PUBLICATIONS

ITU Rec.BT 1886 "Reference Electro-Optical Transfer Function for Flat Panel Displays used in HDTV Studio Production" Mar. 2011.
SMPTE ST 2084:2014 "High Dynamic Range EOTF of Mastering Reference Displays", SMPTE 2014.
Ebner, F. et al "Development and Testing of a Color Space (IPT) with Improved Hue Uniformity" The Sixth Color Imaging Conference: Color Science, Systems, and Applications, pp. 8-13, Nov. 17-20, 1998.

* cited by examiner

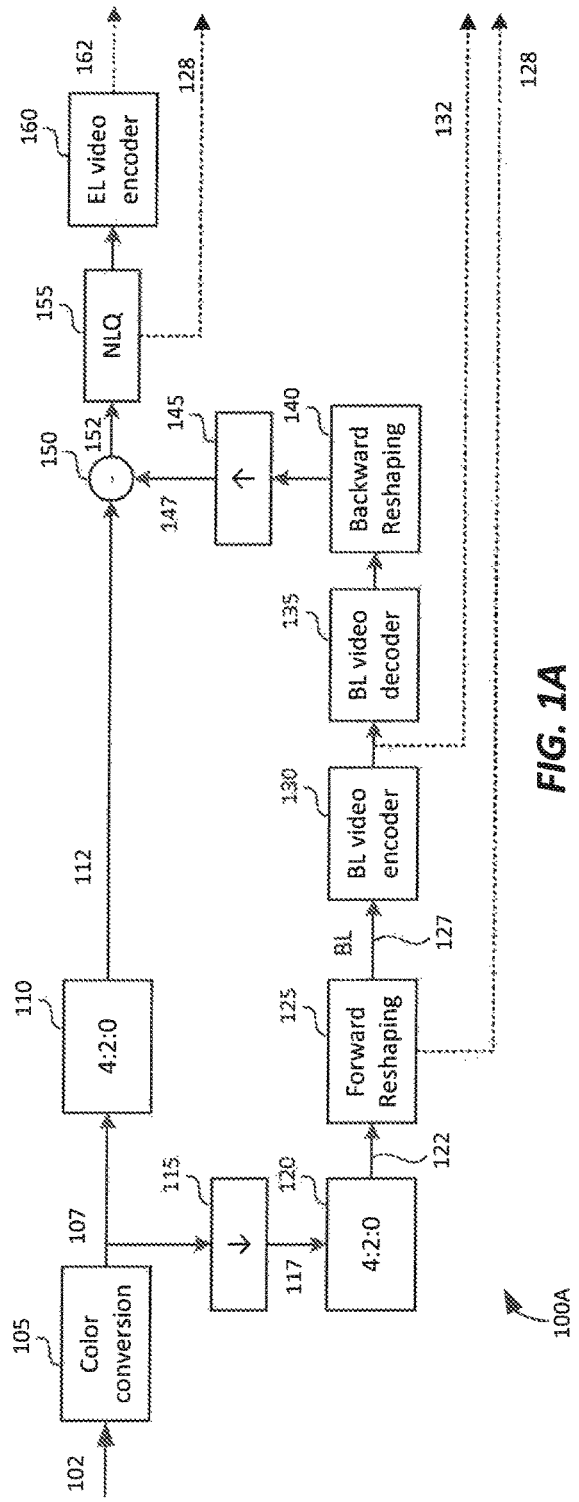
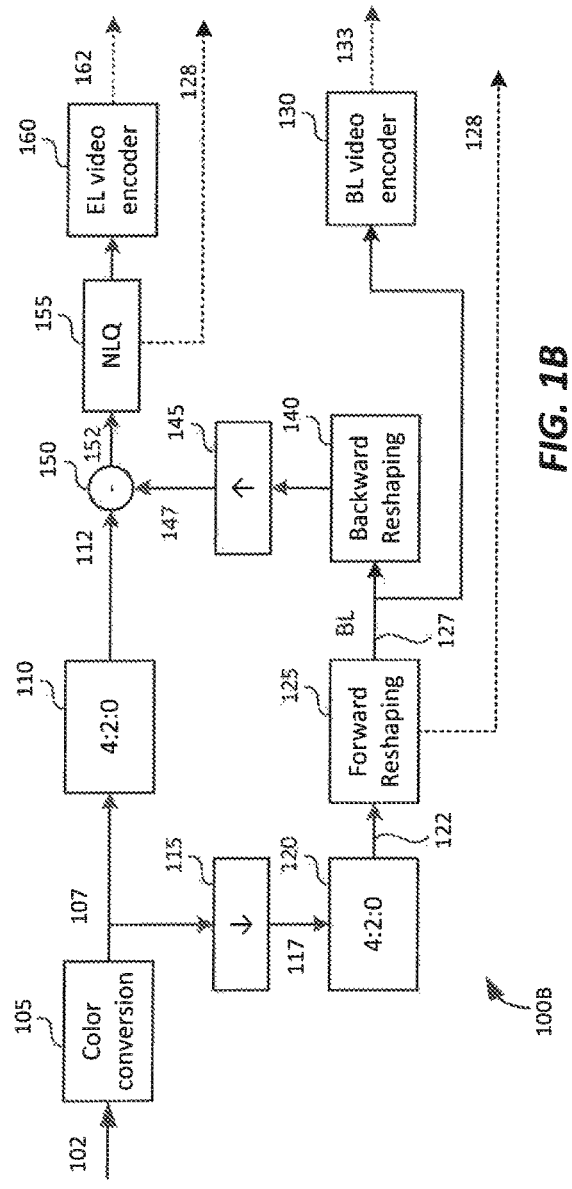
FIG. 1A
FIG. 1B

VIDEO CODING AND DELIVERY WITH BOTH SPATIAL AND DYNAMIC RANGE SCALABILITY

CROSS-REFERENCE TO RELATED APPLICATIONS

This application claims priority from U.S. Provisional Application Ser. No. 62/195,561, filed on Jul. 22, 2015 and U.S. Provisional Application Ser. No. 62/201,266, filed on 5 Aug. 2015 which are hereby incorporated by reference in their entirety.

TECHNOLOGY

The present invention relates generally to images. More particularly, an embodiment of the present invention relates to video coding and delivery with both spatial and dynamic range scalability.

BACKGROUND

The term "ATSC Standards" refers to a family of standards from the Advanced Television Systems Committee (ATSC) for the transmission of digital television signals. As part of developing the next generation of standards (e.g., ATSC 3.0), ATSC explores the transmission of signals with both high dynamic range (HDR) and increased resolutions (e.g., Ultra HD), over a variety of diverse transmission mediums, such as terrestrial and mobile networks.

As used herein, the term 'dynamic range' (DR) may relate to a capability of the human visual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where $n \leq 8$ (e.g., color 24-bit JPEG images) are considered images of standard dynamic range, while images where $n > 8$ may be considered images of enhanced dynamic range. EDR and HDR images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March/2011), which is included herein by reference in its entity, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 $cd/m^2$ or nits. Most consumer HDTVs range from 300 to 500 nits with new models reaching 1000 nits ($cd/m^2$). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084:2014 "High Dynamic Range EOTF of Mastering Reference Displays," which is incorporated herein by reference in its entirety. In general, without limitation, the methods of the present disclosure relate to any dynamic range higher than SDR. As appreciated by the inventors here, improved techniques for the coding and delivery of high-dynamic range images are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 1A and FIG. 1B depict example processes for the video delivery of HDR video using spatial scalability according to an embodiment of this invention;

DESCRIPTION OF EXAMPLE EMBODIMENTS

Figure 1C:
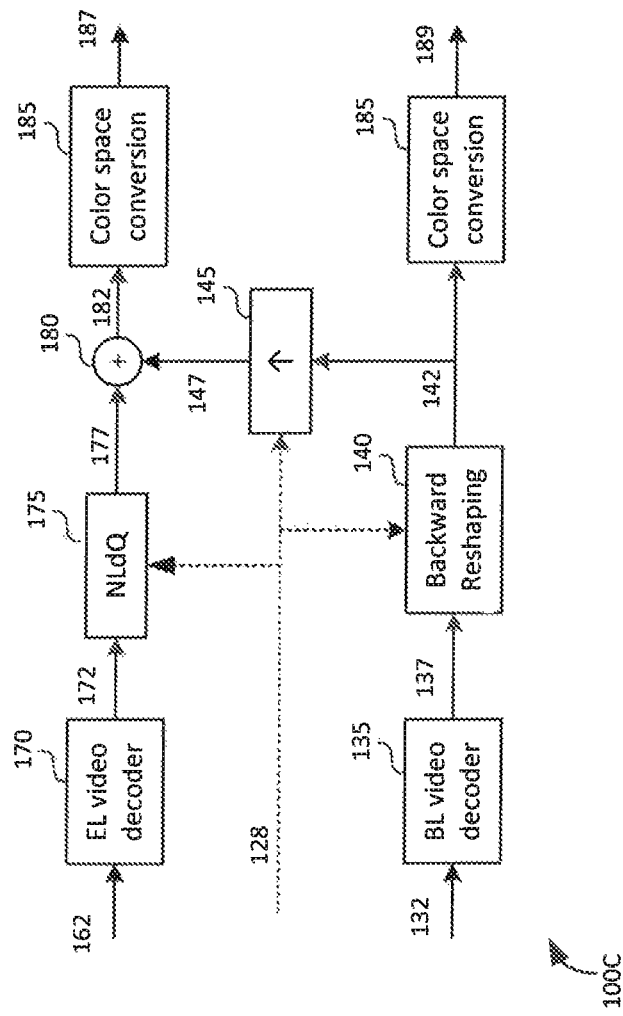
FIG. 1C depicts an example process for video decoding for HDR video with spatial scalability according to an embodiment of this invention.

Video coding and delivery of high dynamic range (HDR) images with spatial and dynamic range scalability is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to video coding and delivery of high-dynamic range images in a perceptually quantized color space using both spatial and dynamic range scalability. In an embodiment, a processor:

accesses a first image in a perceptually-quantized color space, such as IPT-PQ, wherein the first image comprises a first dynamic range and a first spatial resolution;

generates with a first transformation function a second image based on the first image, wherein the transformation function reduces at least one of the spatial resolution or the dynamic range of the first image;

applies a forward reshaping function to the second image to generate a third image with a bit-depth representation lower or equal to the bit-depth representation of the second image;

generates with an encoder a base layer coded bitstream based on the third image;

generates with a backward reshaping function a restored image based on the third image, wherein the restored image comprises a bit depth equal or higher than the bit-depth of the third image;

generates with a second transformation function a fourth image based on the restored image, wherein the fourth image comprises the same dynamic range and spatial resolution as the first image;

generates a residual image based on the first image and the fourth image; and generates with an encoder an enhancement layer coded bitstream based on the residual image.

In another embodiment, a processor receives a base layer (BL) coded bitstream, an enhancement layer (EL) coded bitstream, and metadata;

decodes the EL coded bitstream with a decoder to generate an EL image with an EL spatial resolution;

decodes the BL coded bitstream with a decoder to generate a BL image in a BL spatial resolution, a BL dynamic range, and a perceptually-quantized color space;

generates with a backward reshaping function and the metadata a restored image based on the BL image;

generates with a transformation function and the metadata a predicted image based on the restored image, wherein the predicted image comprises the same spatial resolution as the EL image, wherein the transformation function increases at least one of the spatial resolution or the dynamic range of the restored image; and combines the predicted image and the EL image to generate an enhanced image, wherein the enhanced image comprises at least one of a higher dynamic range or a spatial resolution than the restored image.

Example Video Delivery Processing Pipelines

Spatial Scalability

The IPT-PQ Color Space

FIG. 1A depicts an example process (100A) for the video coding and delivery of high-dynamic range images with spatial scalability. A sequence of video frames (102) at a first resolution (e.g., 2,160p (4K UHD), 4,320p (8K UHD), and the like) and a first color format (e.g. RGB 4:4:4 or YCbCr 4:4:4) is first translated, if needed, preferably into a perceptually-quantized color space, such as the IPT-PQ color space. Most of the existing video compression standards, such as MPEG-1, MPEG-2, AVC, HEVC, and the like, have been tested, evaluated, and optimized for gamma-coded images in the YCbCr color space. Embodiments described herein are applicable to operate under any color space (e.g., RGB, YCbCr, and the like) and any display encoding (e.g., gamma, PQ, and the like); however, experimental results have shown that perceptually-quantized color spaces (e.g., YCbCr-PQ or IPT-PQ) may provide a better representation format for high-dynamic range images with 10 or more bits per pixel per color component.

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. Examples of PQ mapping functions are described in Ref. [3], parts of which have been adopted by the SMPTE ST 2084 specification, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidentally may have a very rough similarity to the way the human visual system responds, a PQ curve, as described in Ref. [3], imitates the true visual response of the human visual system using a relatively simple functional model An example of a perceptually-quantized color space is the IPT-PQ color space. Compared to the traditional gamma-coded YCbCr space, the IPT-PQ color space matches better the viewing characteristics of the human viewing system for HDR images, hence it allows an HDR coding system (e.g., 100A) to provide much better overall picture quality at lower bit depth requirements (e.g., at 10 bits).

The IPT-PQ color space was first introduced in Ref. [1] for display management applications. IPT, as described in Ref. [2], by F. Ebner and M. D. Fairchild, is a model of the color difference between cones in the human visual system. In this sense it is like the YCbCr or CIE-Lab color spaces; however, it has been shown in some scientific studies to better mimic human visual processing than these spaces. Like CIE-Lab, IPT is a normalized space to some reference luminance. In an embodiment, the normalization may be based on the maximum luminance of a target display (e.g., 5,000 nits).

As described in References [1] and [2], the conversion to IPT-PQ may include the following steps:

a) The input (102) is linearized (for example, by applying an inverse gamma or inverse PQ function) and then translated to the LMS color space.

b) According to the Ref. [2], the traditional LMS to IPT color space conversion comprises applying first a non-linear power function to the LMS data and then applying a linear transformation matrix. While one can transform the data from LMS to IPT and then apply the PQ function to be in the IPT-PQ domain, in a preferred embodiment, the traditional power function for a non-linear encoding of LMS to IPT is replaced with the PQ non-linear encoding of each one of the L, M, and S components.

c) Using an LMS to IPT linear transform (e.g., as defined in Ref. [2]) to the output of step b), a signal (107) is generated in the IPT-PQ space.

As described in References [9] and [10], the effects of perceptual quantization may be further improved by taking into consideration content-related characteristics or codec-related parameters.

Following the color conversion (105) to IPT-PQ, signal (107) is downscaled by down-scaler (115) to generate signal (117) at a second resolution (e.g., HD 1080p) lower than the original spatial resolution. Signal (117) may be further filtered and down-sampled in the chroma components by block (120) to generate signal (122) in an IPT-PQ 4:2:0 format.

Currently, most digital interfaces for video delivery, such as the Serial Digital Interface (SDI) are limited to 12 bits per pixel per component. Furthermore, most compression standards, such as H.264 (or AVC) and H.265 (or HEVC), are limited to 10-bits per pixel per component. Therefore efficient encoding and/or quantization is required to support HDR content, with dynamic range from approximately 0.001 to 10,000 cd/m$^2$ (or nits), within existing infrastructures and compression standards.

As used herein, the term "Forward reshaping" refers to a mapping of an input at a first bit depth (e.g., 12-16 bits) to an output of equal or lower bit depth (e.g., 8 or 10 bits) to accommodate the bit-depth requirements of a subsequent video coding pipeline. Even if there is no bit-depth reduction, forward reshaping may improve how highlights and dark areas are represented and coded, thus improving overall compression. For example, signal (122) may be represented at a bit depth of 12-bits or higher, but after forward reshaping, base layer (BL) signal (127) may be represented by only 10 bits or lower. Examples of forward reshaping functions are described in References [4], [5], and [6]. Parameters related to the forward reshaping may be communicated to a decoder using metadata (128).

Following forward reshaping (125), BL signal (127) is encoded and decoded by BL video encoder (130) and corresponding BL video decoder (135). BL video encoder (130) may be any known in the art video encoder, such as an MPEG-2, MPEG-4, H.264, H.265, and the like, video encoder. The output of video decoder (135) represents the expected output of BL signal (127) as it will be received by a downstream decoder (e.g., 100C). Signal (132) represents a coded representation of an HDR signal with a lower spatial resolution than the HDR input (102). Note that a decoded version of signal (132) is not directly viewable (or backwards compatible), in the sense, that a standards-based decoder needs to apply to it a backward reshaping function before it can viewed on a display.

Following decoding (135), its output is processed by backward reshaping unit (140), which implements the reverse of forward reshaping (125), and up-scaler (145), which up-scales the output of the backward reshaping unit back to the same spatial resolution as signal (102), to generate an EDR signal (147) at the same resolution and dynamic range as signal (112). As depicted in FIG. 1A, in an embodiment, signal (112) may represent the input IPT-PQ signal (107) in a 4:2:0 color format, thus matching the color format of signal (147).

Signals (112) and (147) are subtracted to generate a residual signal (152), which, after being processed by non-linear quantizer (155), is encoded by enhancement-layer (EL) video encoder (160) to generate an EL coded bitstream (162). The BL and EL coded bitstreams together with any metadata (128) may be multiplexed to form a coded output to be transmitted from the encoder to a decoder. Examples of non-linear quantization may be found in Ref [7].

FIG. 1B depicts an alternative example process (100B) for the video coding and delivery of high-dynamic range images with spatial scalability according to an embodiment targeting real-time broadcasting applications. Compared to (100A), to improve encoding speed and reduce latency, in (100B), the backward reshaping (140) is applied directly to the output of the forward reshaping unit (125), and the BL video encoder (130) is moved outside of the spatial scalability loop.

FIG. 1C depicts an example decoding process (100C) for a bitstream generated according to the encoders (100A, 100B) depicted in FIGS. 1A and 1B. Following demultiplexing of the incoming BL (132) and EL (162) coded streams (not shown), BL video decoder (135) decodes the coded base layer to generate a decoded base layer (137). It should be noted that decoded signal 137 is not viewable because of the forward reshaping (125). The BL signal (137) may be viewed after a backward reshaping (140) that matches the forward reshaping (125) in the encoder. The proper reshaping is selected based on metadata (128) transmitted from an encoder (e.g., 100A) to the decoder. Following backward reshaping (140), its output signal (142) may be translated to another format (e.g., YCbCr or RGB) and generate HDR BL signal (189) at a reduced resolution (e.g., 1080p).

Decoder (100C) may also generate an HDR signal (187) at a full spatial resolution by applying the following steps:
a) Decode the coded EL stream (162) using EL video decoder (170) to generate a decoded EL signal (172);
b) Apply inverse non-linear de-quantization to signal 172 to generate a de-quantized residual signal (177);
c) Upscale with up-scaler (145) the decoded BL signal (142) to generate up-scaled BL signal (147); and
d) Combine the a de-quantized residual signal (177) and the up-scaled BL signal (147) to generate a full-resolution HDR signal (182) in the IPT-PQ color space.

If needed, color space conversion unit (185) may also translate signal (182) to another color space, such as RGB, YCbCr, and the like.

Dynamic Range Scalability

Figure 2A:
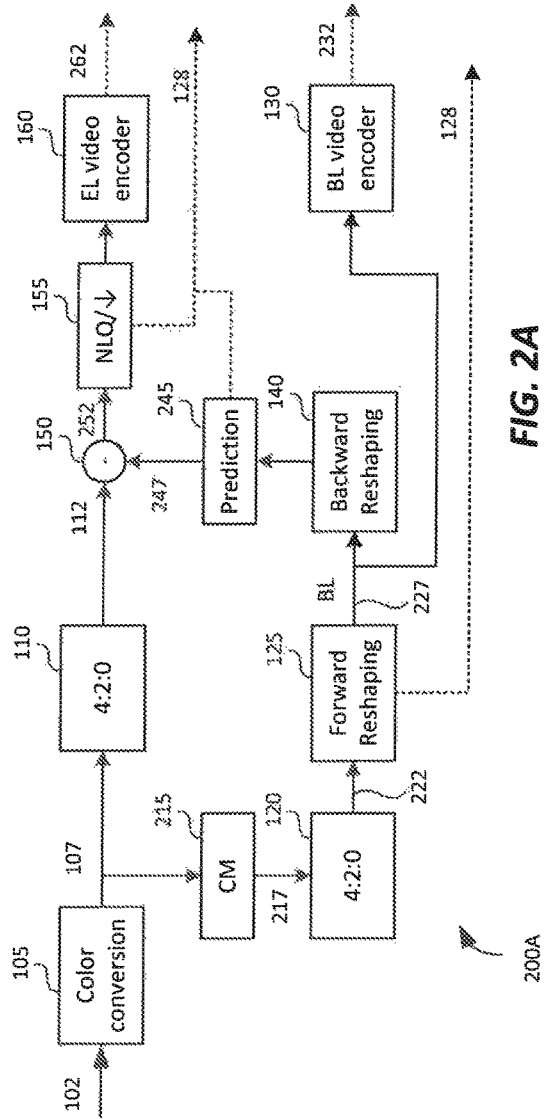
FIG. 2A depicts an example process for the video delivery of HDR video using dynamic range scalability according to an embodiment of this invention.

FIG. 2A depicts an example process (200A) for the video coding and delivery of high-dynamic range images with dynamic range scalability. System (200A) is very similar to system (100B), with the following differences:

a) Base layer (222) has the same spatial resolution as the input (102); however, BL (222) has lower dynamic range than input (102). This is accomplished by replacing spatial downscaler (115) with a content mapping unit (215). Content mapping (CM) (215) may apply any known tone-mapping techniques to lower the dynamic range of input signal (107). An example of a CM unit (215) is described in Ref. [8]. For example, without limitation, in an embodiment, input (102) may be a 4,000 nits signal; however, BL (222) may be a 1,000 nits signal. In some embodiments, content mapping may also be performed off-line by using a combination of tone-mapping tools and custom color grading to generate signal (222). In an embodiment, given a PQ coding in color conversion (105), content mapping (215) may be performed by truncating the least significant bits in signal (107).

b) Upscaler (145) is replaced by prediction unit (245). Predictor (245) performs inverse tone-mapping to generate signal (247), an approximation of signal (112). Examples of predictors are described in Ref. [7] and in Appendix A. In some embodiments, predictor (245) may be a simple linear predictor. The difference signal (252) between the input (112) at full dynamic range and the predicted value (247) is again coded as an enhancement layer by EL video encoder (160) to generate EL stream (262).

In some embodiments, non-linear quantizer (155) may be removed. In some embodiments, an additional (optional) down-sampler may be added before the EL Video encoder (160) (before or after the non-linear quantizer) to reduce the required bit rate for the coded EL stream.

As in (100A), the design of (200A) may be easily modified to incorporate a video encoder-decoder pair as part of the dynamic range reduction loop.

Figure 2B:
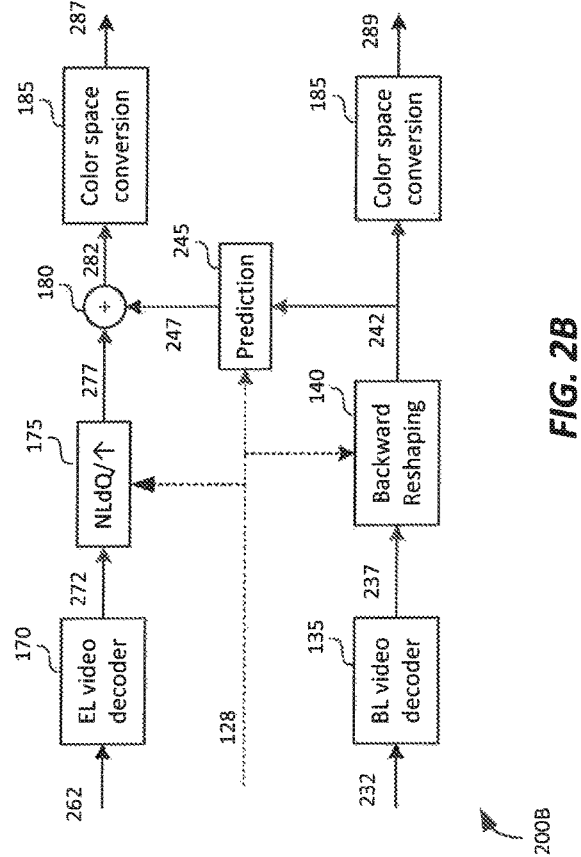
FIG. 2B depicts an example process for video decoding for HDR video with dynamic range scalability according to an embodiment of this invention.

FIG. 2B depicts an example decoding process (200B) for a bitstream generated according to the encoder (200A) depicted in FIG. 2A. Again, the design and data flow process is the same as in (100C), except that upscaler (145) is now replaced by the predictor (245).

In (200B), the non-linear dequantizer (175) may be removed if there is no corresponding non-linear quantizer in the encoder. Furthermore, an optional upsampler may be added following the EL video decoder (170), if the EL stream was downsampled in the encoder.

Spatial and Dynamic Range Scalability

Figure 3A:
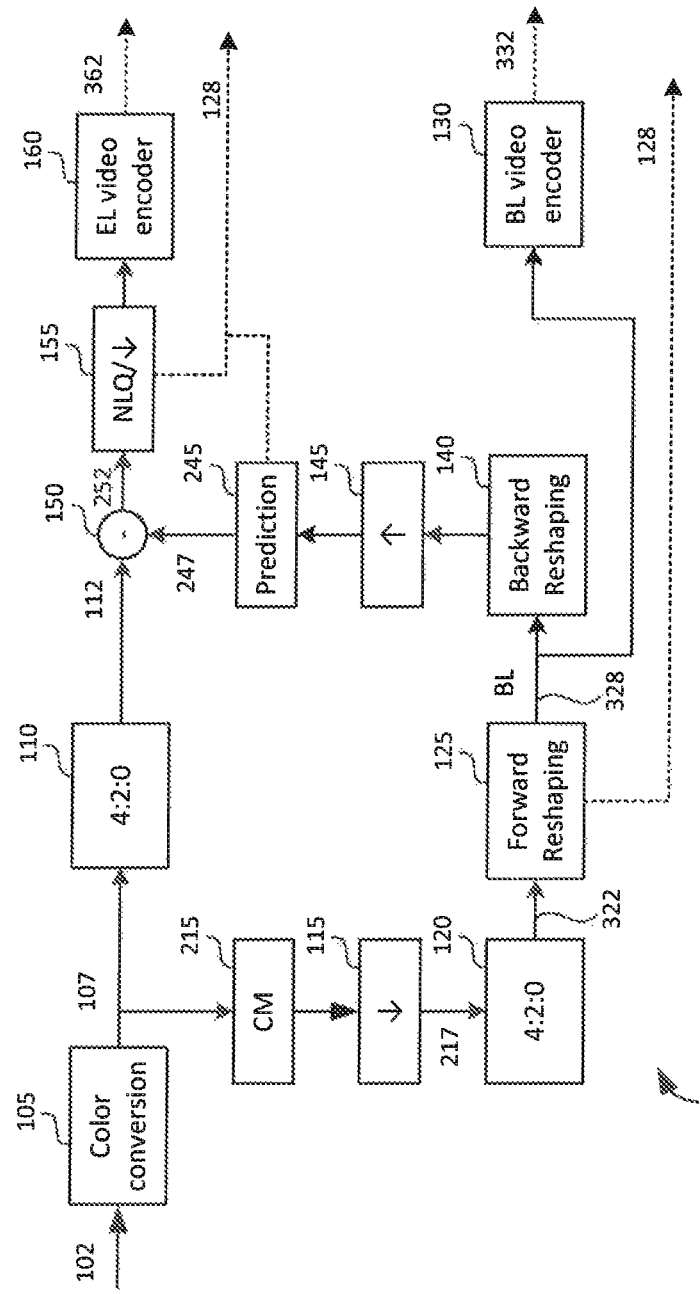
FIG. 3A depicts an example process for the video delivery of HDR video using both spatial and dynamic range scalability according to an embodiment of this invention.
Figure 3B:
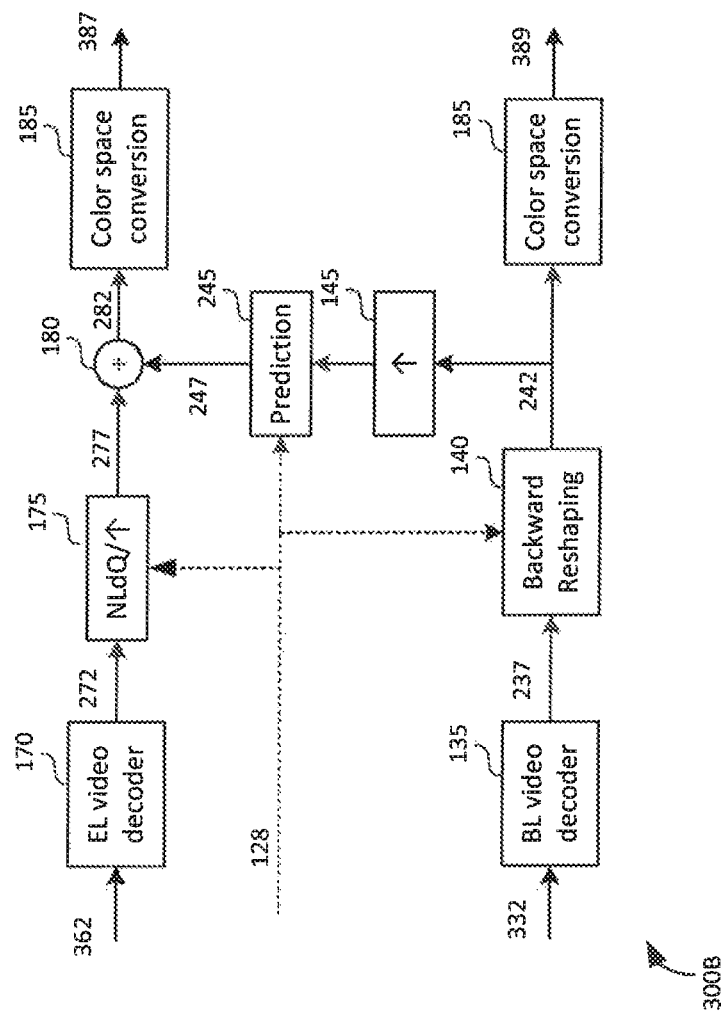
FIG. 3B depicts an example process for video decoding for HDR video with both spatial and dynamic range scalability according to an embodiment of this invention.

FIG. 3A depicts an example process (300A) for the video coding and delivery of high-dynamic range images with both spatial and dynamic range scalability. FIG. 3B depicts the corresponding decoder (300B). Both designs follow the same design principles discussed earlier.

As depicted in FIG. 3A, BL signal (322) has both lower spatial resolution (e.g., 1080p) and lower dynamic range (e.g., 1000 nits) than input (102).

Real-Time Non-Linear Quantization

Figure 4:
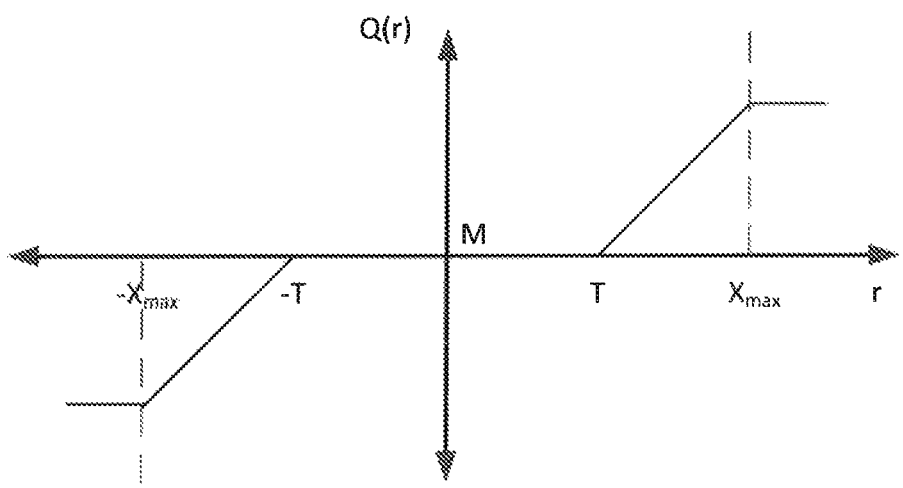
FIG. 4 depicts an example input-output relationship of a non-linear quantizer for a residual signal in an enhancement layer according to an embodiment of this invention.

As discussed earlier, in some embodiments, non-linear quantizer (NLQ) (155) allows the residual (152) to be better mapped to the capabilities of the enhancement layer encoder (160). FIG. 4 depicts an example of the input-output characteristics of such a quantizer according to an embodiment (Ref. [7]).

As depicted in FIG. 4, let $(-X_{max}, X_{max})$ denote the range of pixel values of the residual pixels r (152) to be coded in a frame or frame region of interest. Let Level denote the number of available codewords in each side of the quantizer (e.g., for a bit depth of 8 bits, Level=128 for r≥0), then, given a positive threshold T, let $$SL = \frac{\text{Level}}{X_{max} - T}. \quad (1)$$

Then, given input residuals r, after clipping r within the range $(-X_{max}, X_{max})$, the quantization operations of FIG. 4 may be expressed as $$Q(r) = \begin{cases} \text{floor}(M + (SL*(r-T)) + 0.5) & \text{if } r > T \\ M & \text{if } |r| \leq T \\ \text{floor}(M + (SL*(r+T)) - 0.5) & \text{if } r < -T \end{cases} \quad (2)$$

where Q(r) denotes the quantized output, SL denotes the slope of Q(r) within $(T, X_{max})$, and M denotes an offset value representing the output codeword when the residual r=0.

Threshold T is a relatively small number and in some embodiments T=0.

Parameters T, M (or Offset), $X_{max}$, and SL (or Level) may be defined separately for each color component of residual signal r and may be communicated to a receiver using metadata. In some embodiments, one or more of the NLQ quantization parameters may also be defined for a whole frame, one or more partitions or sub-regions of a frame, or for a group of frames (e.g., a scene).

Given such a quantizer, on a receiver (e.g., (100C)), the de-quantization process (e.g., NLdQ (175)), may be expressed as $$\hat{R}_{cmp} = \begin{cases} 0, & R_{cmp} = M \\ SL*((R_{cmp} - M) - 0.5*\text{sign}(R_{cmp} - M)) + T*\text{sign}(R_{cmp} - M) & R_{cmp} \neq M \end{cases} \quad (3)$$

where $$\text{sign}(x) = \begin{cases} -1 & x < 0 \\ 1 & x \geq 0 \end{cases},$$

$R_{cmp}$ denotes the received (decoded) residual (or EL signal (172)), and $\hat{R}_{cmp}$ denotes the de-quantized output (177), which also may be bounded, e.g., in a range $(-\hat{R}_{max}, \hat{R}_{max})$.

In some embodiments, it may be desirable to collect statistics and define the parameters of the non-linear quantizer on a per scene basis. This may yield better overall quality, but it may not be feasible to implement in a real-time implementation, hence, as appreciated by the inventors, improved methods for real-time adaptation of the NLQ parameters is desired.

Let EL_bitdepth denote the available bit depth for the EL stream. Then, for EL_bitdepth ≥10, assuming a normalized residual input in (0, 1), the fixed, frame-based, quantization parameters $$\text{Offset}_f = M = 2^{EL\_bitdepth-1},$$

$$\text{Level}_f = 2^{EL\_bitdepth-1},$$

$$X_f^{MAX} = X_{max} = 0.5. \quad (4)$$

using HEVC encoding (e.g. the Main 10 Profile) may be yield acceptable quality for most bitstreams; however when using 8-bit H.264 (AVC) encoding, color bleeding and blocky artifacts are quite common. To improve the quality of coding residual data, while still maintaining low-computational complexity for real-time applications, in an embodiment, NLQ parameters are derived as follows.

Let $r_{fi}$ denote a residual value of the i-th pixel of the f-th frame. Denote the maximal positive residual value in frame f as $X_f^+$ and denote the absolute value of the minimal negative residual value in frame f as $X_f^-$. Assume there are p pixels in each frame. Then $$X_f^+ = \max\{r_{fi} | i=0, \ldots, p-1\},$$

$$X_f^- = |\min\{r_{fi} | i=0, \ldots, p-1\}|.$$

In an embodiment, consider a sliding window which looks back B frames and looks ahead A frames. Consider now the maximal value, $\tilde{X}_f^+$, and minimal value, $\tilde{X}_f^-$, within this sliding window; i.e.:

$$\tilde{X}_f^+ = \max\{X_i^+ | i=f-B, f-B+1 \ldots, f-1, f, f+1, \ldots, f+A-1, f+A\},$$

$$\tilde{X}_f^- = |\min\{X_i^- | i=f-B, f-B+1 \ldots, f-1, f, f+1, \ldots, f+A-1, f+A\}|.$$

For A is 0, there are no look-ahead frames and thus zero frame-related delay. Furthermore, the sliding window can be reset at scene boundaries. For example, let the previous and future scene boundaries be located at frames $p_1 < p < p_2$. Let $B' = \max\{p-B, p_1\}$ and $A' = \min\{p+A, p_2\}$, then $$\tilde{X}_f^+ = \max\{X_i^+ | i=f-B', f-B'+1 \ldots, f-1, f, f+1, \ldots, f+A'-1, f+A'\},$$

$$\tilde{X}_f^- = |\min\{X_i^- | i=f-B', f-B'+1 \ldots, f-1, f, f+1, \ldots, f+A'-1, f+A'\}|.$$

Then, in an embodiment, the NLQ parameters are adjusted as $$\text{Offset}_f = M = (2^{EL\_bitdepth} - 1) \frac{\tilde{X}_f^-}{\tilde{X}_f^- + \tilde{X}_f^+} \quad (5)$$

$$\text{Level}_f = \max\{(2^{EL\_bitdepth} - 1) - \text{Offset}_f, \text{Offset}_f\},$$

$$X_f^{MAX} = X_{max} = (1 + \Delta)\max\{\tilde{X}_f^-, \tilde{X}_f^+\}$$

where $\Delta$ denotes a small value.

For chroma, the same equations still apply, but the Level value is defined to be proportional to the maximal residual of the luminance component, i.e.:

$$\text{Chroma\_Level}_f = \min\left\{\text{Luma\_level}_f \frac{X_f^{MAX}(chroma)}{X_f^{MAX}(luma)}, 2^{EL\_bitdepth-1}\right\} \quad (6)$$

The min operator in the above equation helps to constrain the level value to not exceed half of the available codewords in the enhancement layer.

In another embodiment, instead of defining the NLQ parameters in terms of extreme residual values within the sliding window, average values are being used. For example, let $$\tilde{X}_f^+ = \frac{1}{A+B+1} \sum_{i=f-B}^{f+A} X_i^+, \quad (7)$$

$$\tilde{X}_f^- = \frac{1}{A+B+1} \sum_{i=f-B}^{f+A} X_i^-,$$

denote the averages of the extreme residual values within the sliding window, then one can use these values to determine the NLQ parameters as discussed earlier (e.g., using equation (5)).

A=0 will yield again zero frame-delay. As before, the sliding window can be reset at scene boundaries. Assuming the previous and future scene boundaries are located at frame $p_1 < p < p_2$. Let $B' = \max\{p-B, p_1\}$ and $A' = \min\{p+A, p_2\}$, then equations (7) can be re-written as $$\tilde{X}_f^+ = \frac{1}{A'+B'+1} \sum_{i=f-B'}^{f+A'} X_i^+, \quad (8)$$

$$\tilde{X}_f^- = \frac{1}{A'+B'+1} \sum_{i=f-B'}^{f+A'} X_i^-.$$

In equations (7) and (8), in an embodiment, instead of simple averaging one may also apply a weighted average. For example, from equation (7), $$\tilde{X}_f^+ = \frac{1}{A+B+1} \sum_{i=f-B}^{f+A} w_i X_i^+, \quad (9)$$

$$\tilde{X}_f^- = \frac{1}{A+B+1} \sum_{i=f-B}^{f+A} w_i X_i^-,$$

where $\Sigma_i w_i = 1$. In an embodiment, larger weights may be assigned to frames closer to the current frame (e.g., $w_f > w_{f-1}$ and $w_f > w_{f+1}$).

REFERENCES

Each of the following references is incorporated herein by reference in its entirety for all purposes.

1. R. Atkins et al., "Display Management for High Dynamic Range Video," WO Publication 2014/130343.
2. F. Ebner and M. D. Fairchild, "*Development and testing of a color space (ipt) with improved hue uniformity*," Proc. 6$^{th}$ Color Imaging Conference: Color Science, Systems, and Applications, IS&T, Scottsdale, Ariz., November 1998, pp. 8-13.
3. J. S. Miller et al., "Device and Method of Improving the Perceptual Luminance Nonlinearity-Based Image Data Exchange Across Different Display Capabilities," U.S. Pat. No. 9,077,994.
4. G-M Su et al., "Adaptive Reshaping for Layered Coding of Enhanced Dynamic Range Signals," WO Publication 2014/204865.

5. G-M Su et al., "Encoding Perceptually-Quantized Video Content in Multi-Layer VDR Coding," WO Publication 2014/160705.
6. T. Lu et al., "Signal Reshaping and Coding in the IPT-PQ Color Space," U.S. Provisional Patent Application, Ser. No. 62/193,390, filed on Jul. 16, 2015, also PCT Application Ser. No. PCT/US2016/028261, filed on Apr. 19, 2016.
7. G-M Su et al., "Backward-Compatible Coding for Ultra High Definition Video Signals with Enhanced Dynamic Range," WO Publication 2014/107255.
8. A. Ballestad and A. Kostin, "Method and Apparatus for Image Data Transformation," U.S. Pat. No. 8,593,480.
9. J. Froehlich et al., "Content-Adaptive Perceptual Quantizer for High Dynamic Range Images," U.S. Provisional Application Ser. No. 62/126,925, filed on Mar. 2, 2015, also PCT Application Ser. No. PCT/US2016/020230, filed on Mar. 1, 2016.
10. J. Froehlich et al., "Encoding and Decoding Perceptually-Quantized Video Content," U.S. Provisional Application, Ser. No. 62/056,093, filed on Sep. 26, 2014, WO Publication 2016/049327.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to scalable video coding and delivery of HDR video, such as those described herein. The computer and/or IC may compute any of a variety of parameters or values that relate to scalable video coding and delivery of HDR video processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to scalable video coding and delivery of HDR video as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient scalable video coding and delivery of HDR video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

APPENDIX A

Polynomial Prediction

In an embodiment, given base layer source (SDR) data $S_{cmp}(p)$, a predictor computes EDR data $\hat{V}_{cmp}(p)$ using, without limitation, a series of second-order piece-wise polynomials. The polynomial function coefficients are $\{fpoly\_coef_{y,x,c,j,i}\}$, where $0 \leq c \leq 2$ (c is the color channel index), $0 \leq j \leq 7$ (j is the segment index), $0 \leq i \leq 2$ (i is the coefficient order), and (y, x) is the partition index, where an image is partitioned into multiple non-overlapping rectangle regions:

$fpoly\_coef_{y,x,c,j,i}$ are the coefficients for each color channel c, each segment j and each order i in partition (y, x)

$fpoly\_coef_{y,x,c,j,i}$=(poly_coef_int [y] [x] [c] [j] [i]>>coefficient_log 2_denom)|poly_coef [y] [x] [c] [j] [i]

The term coefficient_log 2_denom denotes the number of bits to represent the fractional part of the polynomial coefficient. In an embodiment, without limitation, each polynomial coefficient, $fpoly\_coef_{y,x,c,j,i}$, is a real number with a bit depth of coefficient_log 2_denom+7, as specified in the following list:

Bit[coefficient_log 2_denom+6]: Sign bit
Bit[coefficient_log 2_denom+5:coefficient_log 2_denom]: Integer part
Bit[coefficient_log 2_denom−1:0]: Fractional part To find the pivot values, pivot_idx [cmp], for a given sample $S_{cmp}$, the pivot_value array is traversed until the sample value lies between two pivot values; this determines the segment. The sample is capped at the low- and high-end pivot values.

Full polynomial prediction for an N-order polynomial is calculated according to $$\hat{V} = \sum_{i=0}^{N} fpoly\_coef_{j,i} * (S/2^{BL\_bit\_depth})^i, \tag{A1}$$

where fpoly_coef are prediction coefficients either computed by the encoder or signaled to a decoder as part of metadata, and BL_bit_depth is the bit depth for the base layer. The calculation can be carried out in fixed point or 32-bit floating point. In a preferred embodiment, it is desired that both the encoder and the decoder compute predicted values in the same way to minimize drift due to round-off errors. In an embodiment, an example fixed-point implementation is shown in Table A-1. The same approach may also be used for computing prediction values using polynomials of arbitrary order.

The value of num_pivots_minus2 indicates how many pivot points exist for the component cmp of the current BL video frame. The value of each pivot point is stored in a sorted array pivot_value [cmp] [ ], where pivot_value [cmp] [0] is a low end-point value and pivot_value [cmp] [num_pivots_minus2 [cmp]+1] is a high end-point value.

poly_coef_int [y] [x] [cmp] [pivot_idx [cmp]] [i] specifies the integer portion of polynomial coefficient $fpoly\_coef_{y,x,c,j,i}$.

TABLE A-1

Fixed-point computation for 2-order prediction polynomials

```
/* Sample prediction using a 2-order polynomial.
   v = a*s^2+ b*s+ c
Notation:
S_cmp(p) is the input base layer signal of color component cmp at position p.
Vhat_cmp(p) is the base layer predictor of color component cmp at position p.
*/
   int y = partition_vert_coord;
   int x = partition_horz_coord;
   int pivot_idx[3];
   int pivot_value[3][ ];
   { // for color component cmp
       // input data type
       int64 tr;
       int64 r1;              // 1st order
       int64 r2;              // 2nd order
       int MAX_POLY_ORDER   = 2;
       int MAX_BL_BIT_DEPTH = 10;
       int poly_binary_point = MAX_POLY_ORDER * MAX_BL_BIT_DEPTH;
       int comp_binary_point =16;
       // input data
       if(        S_cmp(p) < pivot_value[cmp][0])
                  S_cmp(p) = pivot_value[cmp][0];
       if(        S_cmp(p) > pivot_value[cmp][num_pivots_minus2[cmp]+1])
                  S_cmp(p) = pivot_value[cmp][num_pivots_minus2[cmp]+1];
       tr = (int64)S_cmp(p)  ;  // [7:0] for 8-bit BL signal or [9:0] for 10-bit
BL signal
       // first order input
       r1 = tr << (poly_binary_point − BL_bit_depth);
       // [19:12] for 8-bit [19:10] for 10-bit
       // second order input
       r2 = (tr * tr ) << (poly_binary_point − 2*BL_bit_depth) ;
       // [19:5] for 8-bit [19:0] for 10-bit
       // coefficient data type
       int64 rc ;         // constants
       int64 rc1;         // 1st order
       int64 rc2;         // 2nd order
       // constant coefficients
       rc = poly_coef_int[y][x][cmp][pivot_idx[cmp]][0] <<
coefficient_log2_denom;
       // arithmetic left shift
       rc |= poly_coef[y][x][cmp][pivot_idx[cmp]][0];
       rc <<= poly_binary_point;
       // first order coefficients
       rc1 = poly_coef_int[y][x][cmp][pivot_idx[cmp]][1] <<
coefficient_log2_denom;
       // arithmetic left shift
       rc1 |= poly_coef[y][x][cmp][pivot_idx[cmp]][1];
       // second order coefficients
       rc2 = poly_coef_int[y][x][cmp][pivot_idx[cmp]][2] <<
coefficient_log2_denom;
       // arithmetic left shift
       rc2 |= poly_coef[y][x][cmp][pivot_idx[cmp]][2];
       // output data type
       int64 rr;
       rr = (int64)rc + (int64)rc1*r1 + (int64)rc2*r2;
       rr = rr<0? 0:rr;
         Vhat_cmp(p)= (uint32) (rr >> ( coefficient_log2_denom +
poly_binary_point −
                                  comp_binary_point));
       // bit[comp_binary_point−1:0], sign is at bit[comp_binary_point]
           Vhat_cmp(p) = Vhat_cmp(p)>0xFFFF? 0xFFFF: Vhat_cmp(p);
}
``` poly_coef [y] [x] [cmp] [pivot_idx [cmp]] [i] specifies the fractional portion of polynomial coefficients fpoly_coef$_{y,x,c,j,i}$.

As depicted in Table A-1, the prediction utilizes 64-bit integer operations, preserving all precision until then end, when the predicted value is rounded to the nearest integer supported by the output bit depth. The prediction method also combines data normalization with the proper placing of the binary point. For example, consider a 10-bit input value of 255 which needs to be normalized (e.g., right shifted by 10 bits to generate 255/1024) and then positioned to the proper binary point by a left shift (say, at bit 20). In Table A-1, the two shifts are combined for a single left shift by 20−10=10.

What is claimed is:

1. A method to code high dynamic range images with a processor, the method comprising:
   accessing with a processor a first image (107) in a first color space, wherein the first image comprises a first dynamic range and a first spatial resolution;
   generating with a first transformation function (115, 215) a second image (117, 217) based on the first image, wherein the transformation function reduces at least one of the spatial resolution or the dynamic range of the first image;
   applying a forward reshaping function (125) to the second image to generate a third image (127) with a bit-depth lower or equal to the bit-depth of the second image;
   generating with an encoder a base layer coded bitstream (132) based on the third image;
   generating with a backward reshaping function (140) a restored image based on the third image, wherein the restored image comprises a bit depth higher or equal than the bit-depth of the third image;
   generating with a second transformation function (145, 245) a fourth image based on the restored image, wherein the fourth image comprises the same dynamic range and spatial resolution as the first image;
   generating a residual image based on the first image and the fourth image; and
   generating with an encoder an enhancement layer coded bitstream based on the residual image.

2. The method of claim 1 wherein the first image comprises a high dynamic range image with a first dynamic range of at least 1,000 nits.

3. The method of claim 1, wherein the first color space comprises the IPT-PQ color space, the YCbCr-PQ color space, or the YCbCr-gamma color space.

4. The method of claim 1, wherein the first transformation function comprises a spatial downscaler to reduce the spatial resolution of the first image or a content mapper to reduce the dynamic range of the first image.

5. The method of claim 1, wherein the first transformation function comprises a spatial downscaler and a content mapper to reduce both the spatial resolution and the dynamic range of the first image.

6. The method of claim 1, wherein the second image is translated to a 4:2:0 format image before being processed by the forward reshaping function.

7. The method of claim 1, wherein the encoder to generate the base layer bitstream comprises an HEVC Main 10 encoder.

8. The method of claim 1, wherein the second transformation function comprises a spatial upscaler to increase the spatial resolution of the restored image or a predictor to increase the dynamic range of the restored image.

9. The method of claim 1, wherein the second transformation function comprises a spatial upscaler and a predictor to increase the spatial resolution and the dynamic range of the restored image.

10. The method of claim 1, further comprising:
    generating with a decoder (135) a decoded image based on the base layer coded bitstream (132); and
    applying the decoded image to the backward reshaping function to generate the restored image.

11. The method of claim 1, further comprising applying a non-linear quantizer and/or a spatial downscaler to the residual image before generating the enhancement layer coded bitstream.

12. The method of claim 1, further comprising generating bitstream metadata related to parameters of at least one of the first transformation function, the forward reshaping function, the backward reshaping function, or the second transformation function, and signaling bitstream metadata to a decoder together with the base layer bitstream and the enhancement layer coded bitstream.

13. The method of claim 11, wherein parameters of the non-linear quantizer are determined based on extreme minimum and maximum residual values in the residual image and one or more prior and/or subsequent residual images in a sliding window.

14. The method of claim 11, wherein the sliding window is bounded by a previous scene boundary and a future scene boundary.

15. The method of claim 13, wherein the parameters of the non-linear quantizer are based on an average of minimum and maximum residual values in the residual image and the one or more prior and/or subsequent residual images in the sliding window.

16. A method to decode a high dynamic range with a processor, the method comprising:
    accessing with a processor a base layer (BL) coded bitstream, an enhancement layer (EL) coded bitstream, and metadata received as part of the BL and EL coded bitstreams;
    decoding the EL coded bitstream with a decoder (170) to generate an EL image (272) with an EL spatial resolution;
    decoding the BL coded bitstream with a decoder (135) to generate a BL image (237) in a BL spatial resolution, a BL dynamic range, and a BL color space;
    generating with a backward reshaping function (140) and the metadata a restored image (242) based the BL image, wherein the restored image has a higher bit depth than the BL image;
    generating with a transformation function (145, 245) and the metadata a predicted image based on the restored image, wherein the predicted image comprises the same spatial resolution as the EL image, wherein the transformation function increases at least one of the spatial resolution or the dynamic range of the restored image;
    combining the predicted image and the EL image to generate an enhanced image, wherein the enhanced image comprises at least one of a higher dynamic range or a spatial resolution than the restored image.

17. The method of claim 16, wherein the decoder (135) to generate the BL image comprises an HEVC Main 10 decoder.

18. The method of claim 16, wherein the transformation function comprises a spatial upscaler to increase the spatial resolution of the restored image or a predictor to increase the dynamic range of the restored image.

19. The method of claim 16, wherein the transformation function comprises a spatial upscaler and a predictor to increase the spatial resolution and the dynamic range of the restored image.

20. The method of claim 16, further comprising applying a non-linear dequantizer and/or an upscaling function to the EL signal before combining it with the predicted image to generate the enhanced image.

21. The method of claim 16, wherein the BL color space comprises the IPT-PQ color space, the YCbCr-PQ color space, or the YCbCr-gamma space.

22. An apparatus comprising a processor and configured to perform the method recited in claim 1.

23. A non-transitory computer-readable storage medium having stored thereon computer-executable instructions for executing with one or more processors a method in accordance with claim 1.

\* \* \* \* \*